United States Patent [19]

Yamamoto et al.

[11] Patent Number: 4,774,409
[45] Date of Patent: Sep. 27, 1988

[54] RADIATION IMAGE RECORDING AND READ-OUT APPARATUS

[75] Inventors: Takaaki Yamamoto; Terumi Matsuda; Kaoru Tamura; Nobuyoshi Nakajima, all of Kanagawa, Japan

[73] Assignee: Fuji Photo Film Co., Ltd., Japan

[21] Appl. No.: 787,099

[22] Filed: Oct. 15, 1985

[30] Foreign Application Priority Data

Oct. 16, 1984 [JP] Japan ................. 59-216901
Oct. 16, 1984 [JP] Japan ................. 59-216912
Oct. 17, 1984 [JP] Japan ................. 59-217948

[51] Int. Cl.⁴ .................................. G03C 5/16
[52] U.S. Cl. ...................... 250/327.2; 250/484.1
[58] Field of Search ......... 198/494; 15/102, 104 A, 15/100; 250/327.2, 484.1

[56] References Cited

U.S. PATENT DOCUMENTS 2,018,719 10/1935 Haug .................... 198/494
3,914,817 10/1975 Lindsay .................. 15/100
4,543,479 9/1985 Kato ..................... 250/327.2
4,585,944 4/1986 Teraoka .................. 250/327.2
4,603,253 7/1986 Nakagawa ................. 250/327.2

Primary Examiner—Carolyn E. Fields
Attorney, Agent, or Firm—Gerald J. Ferguson, Jr.

[57] ABSTRACT

In a radiation image recording and read-out apparatus, stimulable phosphor sheets are circulated along a predetermined circulation path through an image recording section for recording a radiation image of an object on the stimulable phosphor sheet by exposing the stimulable phosphor sheet to radiation through the object, an image read-out section including a stimulating ray source which is disposed in the circulation path and emits stimulating rays for scanning the stimulable phosphor sheet and a photoelectric converter which receives light emitted from the stimulable phosphor sheet to obtain an image signal and an erasing section for releasing residual radiation energy in the stimulable phosphor sheet before the stimulable phosphor sheet is returned to the image recording section. A cleaning sheet having thereon an adhesive material layer is transferred along the circulation path.

11 Claims, 3 Drawing Sheets

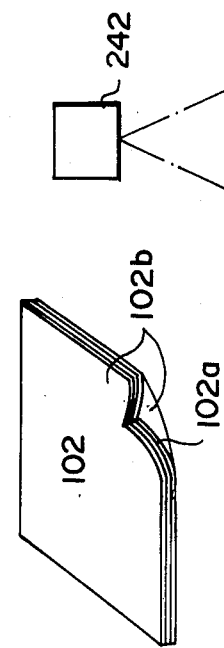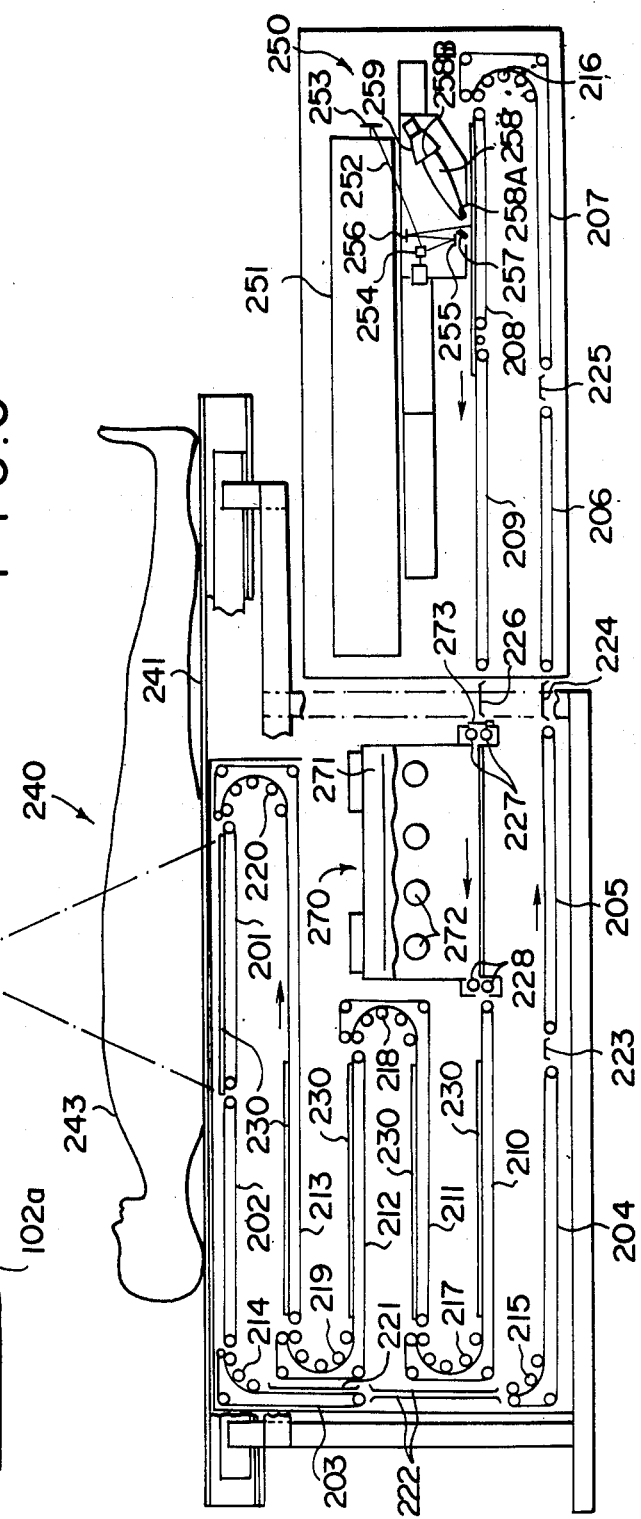

RADIATION IMAGE RECORDING AND READ-OUT APPARATUS

BACKGROUND OF THE INVENTION

1. Field of the Invention

This invention relates to a radiation image recording and read-out apparatus for recording a radiation image of an object on a stimulable phosphor sheet and photoelectrically read-out the image recorded on the stimulable phosphor sheet.

2. Description of the Prior Art

When certain kinds of phosphors are exposed to a radiation such as X-rays, α-rays, β-rays, γ-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. Nos. 4,258,264, 4,276,473, 4,315,318 and 4,387,428, and Japanese Unexamined Patent Publication No. 56(1981)-11395, it has been proposed to use a stimulable phosphor in a radiation image recording and reproducing system. Specifically, a sheet comprising the stimulable phosphor is first exposed to a radiation passing through an object to have a radiation image stored therein, and is then scanned with stimulating rays which cause it to emit light in proportion to the radiation energy stored. The light emitted from the stimulable phosphor sheet when the sheet is exposed to the stimulating rays is photoelectrically detected and converted to an electric image signal, which is processed as desired to reproduce a visible image having an improved quality, particularly a high diagnostic efficiency and accuracy. The finally obtained visible image may be reproduced in the form of a hard copy or may be displayed on a cathode ray tube (CRT). In this radiation image recording and reproducing system, the stimulable phosphor sheet is used to temporarily store the radiation image in order to reproduce the final visible image therefrom in a final recording medium. For economical reasons, therefore, it is desirable that the stimulable phosphor sheet be used repeatedly.

Further, in a mobile X-ray diagnostic station such as a traveling X-ray diagnostic station in the form of a vehicle like a bus which is provided with a radiation image recording and read-out apparatus for use in the aforesaid radiation image recording and reproducing system and moves from place to place to record radiation images for mass medical examinations, it is disadvantageous to load the mobile X-ray diagnostic station with a large number of stimulable phosphor sheets, and the number of the stimulable phosphor sheets which can be loaded on the mobile X-ray diagnostic station is limited. Therefore, it is desired to load the mobile X-ray diagnostic station with stimulable phosphor sheets which can be used repeatedly, once store the radiation images of the objects in the stimulable phosphor sheets, transfer the electric image signals read out from the stimulable phosphor sheets into recording medium having a large storage capacity, such as a magnetic tape, and circulate and reuse the stimulable phosphor sheets for further image recording and read-out operations, thereby to obtain the radiation image signals of many objects. Further, when image recording is conducted continuously by circulating and reusing the stimulable phosphor sheets, it becomes possible to increase the image recording speed in mass medical examination. This is very advantageous in practical use.

In order to reuse stimulable phosphor sheets as described above, the radiation energy remaining in the stimulable phosphor sheet after it is scanned with stimulating rays to read out the radiation image stored therein should be erased by exposure to light or heat as described, for example, in Japanese Unexamined Patent Publication No. 56(1981)-12599 or U.S. Pat. No. 4,400,619. The stimulable phosphor sheet should then be used again for radiation image recording.

From the aforesaid viewpoint, the applicant proposed in Japanese Patent Application No. 58(1983)-66730 a built-in type radiation image recording and read-out apparatus comprising:

(i) a circulating and conveying means for conveying at least one stimulable phosphor sheet for recording a radiation image thereon along a predetermined circulation path, (ii) an image recording section positioned on said circulation path for recording a radiation transmission image of an object on said stimulable phosphor sheet by exposing said stimulable phosphor sheet to a radiation passing through said object, (iii) an image read-out section positioned on said circulation path and provided with a stimulating ray source for emitting stimulating rays for scanning said stimulable phosphor sheet carrying said radiation image stored therein in said image recording section, and a photoelectric read-out means for detecting light emitted from said stimulable phosphor sheet scanned with said stimulating rays to obtain an electric image signal, and (iv) an erasing section for, prior to the next image recording on said stimulable phosphor sheet for which the image read-out has been conducted in said image read-out section, having said stimulable phosphor sheet release the radiation energy remaining in said stimulable phosphor sheet, whereby said stimulable phosphor sheet is circulated through said image recording section, said image read-out section and said erasing section and reused for radiation image recording.

In the aforesaid radiation image recording and read out apparatus, recording and read-out of radiation images can be conducted continuously and efficiently. The radiation image recording and read-out apparatus of this type will hereinbelow be referred to as a "built-in type radiation image recording and read-out apparatus".

The built-in type radiation image recording and read-out apparatus is advantageous in various points. For example, when recording radiation images of a number of people at a mobile diagnostic station such as a bus equipped with an X-ray photographing apparatus, the same number of stimulable phosphor sheets as the number of the people must be prepared if the stimulable phosphor sheets are not repeatedly used. However, the number of stimulable phosphor sheets that can be carried on such a mobile vehicle is limited. This problem can be overcome by repeatedly using a stimulable phosphor sheet and storing the image signals read in the image read-out section in a recording medium having a large memory capacity. Further, circulation of the stimulable phosphor sheets facilitates continuous photographing, shortening the time required to record radiation images of a given number of people.

However, with the built-in type radiation image recording and read-out apparatus, there is a problem that fine dust particles floating in the air and produced in the apparatus are apt to settle on the surface of the stimulable phosphor sheet. Dust settling on the side of the stimulable phosphor sheet bearing the stimulable phosphor will prevent light from being emitted from the part of the stimulable phosphor sheet covered with the dust upon exposure to the stimulating rays so that the part is reproduced as a white spot. For example, in a radiation image of a cancer focus, a badly turned mineralized part of the cancer appears as a white spot. Other diseased parts also can appear as white spots. Thus, the part of the body corresponding to the part of the stimulable phosphor sheet covered with the dust can be mistakenly diagnosed as diseased parts.

Even if the surface of the stimulable phosphor sheet is cleaned, dust is apt to settle again on the stimulable phosphor sheet during conveyance thereof since there is usually dust on the circulating and conveying means such as e.g. endless belts or nip rollers, and components associated with the circulating and conveying means. Further, it is difficult and troublesome to clean the circulating and conveying means with cleaning cloth, cleaning liquid and the like due to the complicated structure of the circulating and conveying means.

SUMMARY OF THE INVENTION

In view of the foregoing observations and description, the primary object of the present invention is to provide a built-in type radiation image recording and read-out apparatus provided with means for automatically cleaning the circulating and conveying means, thereby preventing dust settling on the stimulable phosphor sheet.

The radiation image recording and read-out apparatus in accordance with the present invention is characterized by a cleaning sheet which is provided with an adhesive layer on at least one side thereof and is conveyed by the circulating and conveying means along the same circulation path as the stimulable phosphor sheet. As the cleaning sheet is conveyed along the circulation path, dust on the conveying means adheres to the adhesive layer of the cleaning sheet and is thereby removed from the conveying means.

In one embodiment of the present invention, the cleaning sheet is constantly being circulated along the circulation path together with the stimulable phosphor sheet. It is preferred that the cleaning sheet be formed integrally with the stimulable phosphor sheet.

In another embodiment of the present invention, the cleaning sheet is moved along the circulation path only when necessary.

BRIEF DESCRIPTION OF THE DRAWINGS

FIG. 2 is a perspective view of a cleaning sheet employed in the radiation image recording and read-out apparatus of FIG. 1, FIG. 5 is a schematic side view showing a radiation image recording and read-out apparatus in accordance with another embodiment of the present invention.

DESCRIPTION OF THE PREFERRED EMBODIMENTS

Figure 1:
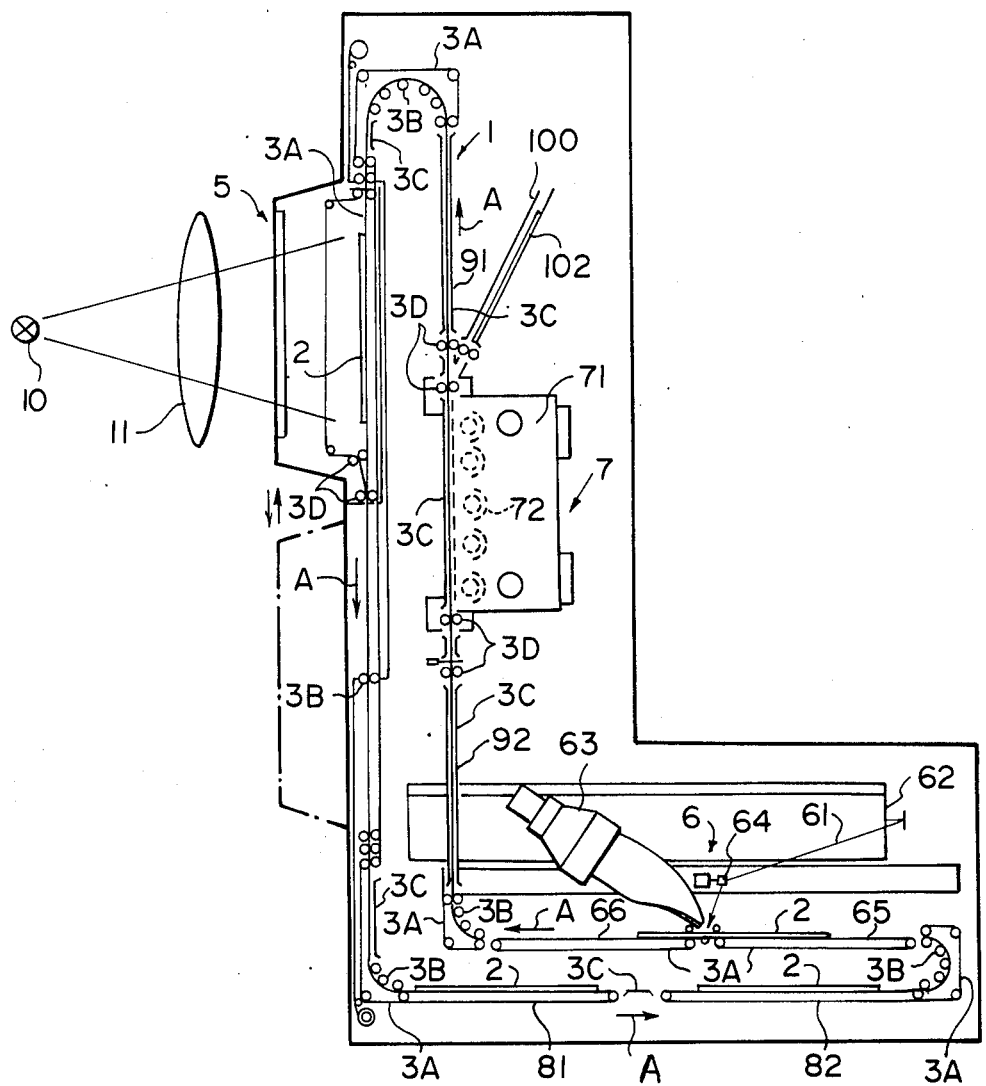
FIG. 1 is a schematic side sectional view showing a radiation image recording and read-out apparatus in accordance with an embodiment of the present invention.

In FIG. 1, a radiation image recording and read-out apparatus in accordance with an embodiment of the present invention includes a circulating and conveying means comprising endless belts 3A, guide rollers 3B driven by the endless belts 3A, guide plates 3C and nip rollers 3D. Stimulable phosphor sheets 2 which are four in number in this particular embodiment are conveyed by the circulating and conveying means along an L-shaped circulation path 1. An image recording section 5, an image read-out section 6 and an erasing section 7 are disposed along the circulation path in this order as seen in the direction of conveyance of the stimulable phosphor sheets 2 shown by arrows A.

In the image recording section 5, each stimulable phosphor sheet 2 is exposed to radiation emitted from a radiation source 10 through an object 11 to record thereon a radiation image of the object 11 as a pattern of stored radiation energy. After exposure to radiation in the image recording section 5, each stimulable phosphor sheet 2 is conveyed in the direction of the arrows A by the circulating and conveying means to the image read-out section 6.

The image read-out section 6 comprises a stimulating ray source 62 emitting stimulating rays 61 which may be a laser beam, for instance, a galvanometer mirror 64 for deflecting the stimulating rays 61 to scan the stimulable phosphor sheet 2, and a photoelectric read-out means 63 which receives light emitted from the stimulable phosphor sheet 2 upon exposure to the stimulating rays 61 and converts it into an electric image signal. The image information is read while the stimulable phosphor sheet 2 is conveyed at a constant speed from a position indicated at 65 to a position indicated at 66. The image signal obtained by the photoelectric read-out means 63 is fed to an image processing circuit (not shown) and then fed to an image reproducing system such as a CRT or a recording device for reproducing a radiation image on a photosensitive film by scanning the photosensitive film with a light spot, or a memory for storing the image signal such as a magnetic recording tape.

The stimulable phosphor sheet 2 is subsequently conveyed to the erasing section 7 by the endless belts 3A and the like. The erasing section 7 comprises a housing 71 and a plurality of erasing light sources 72 emitting visible light. The erasing light source 72 may be a tungsten lamp, a sodium-vapor lamp, a xenon arc lamp, an iodine-vapor lamp and the like. By exposing the stimulable phosphor sheet 2 to the light emitted from the erasing light source 72, residual radiation energy in the stimulable phosphor sheet 2 is released.

Then the stimulable phosphor sheet 2 is returned to the image recording section 5.

Two waiting zones 81 and 82 are provided between the image recording section 5 and the image read-out section 6, and another two waiting zones 91 and 92 are provided between the image read-out section 6 and the image recording section 5, respectively upstream and downstream of the erasing section 7. The stimulable phosphor sheets 2 are caused to stay at the waiting zones as occasion arises so that the stimulable phosphor sheets 2 do not interfere with each other.

Figure 3:
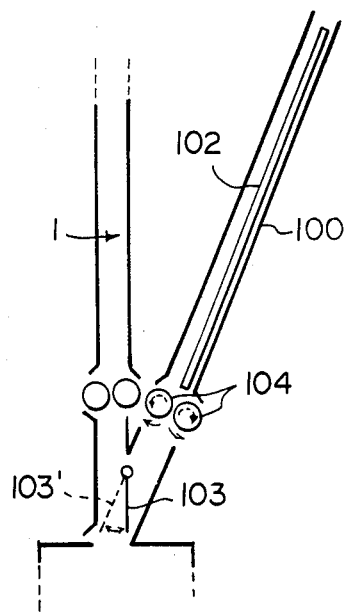
FIG. 3 is a fragmentary side view of a part of the radiation image recording and read-out apparatus of FIG. 1.

A cleaning sheet waiting zone 100 branches from the circulation path 1 downstream of the erasing section 7. As shown in FIG. 2, the cleaning sheet 102 comprises a base sheet 102a and two adhesive material layers 102b applied one to each side of the base sheet 102a. The base sheet 102a is preferably of the same material as the base sheet of the stimulable phosphor sheet 2 on which the stimulable phosphor layer is formed, e.g., polyethylene terephthalate. The adhesive material layer 102b may be of an acrylic solvent type adhesive, for instance, and may be directly coated on the base sheet 102a or may be transferred from release paper. The cleaning sheet 102 has a thickness and rigidity substantially equal to those of the stimulable phosphor sheet 2, and the size of the cleaning sheet 102 may be equal to or slightly larger than that of the stimulable phosphor sheet 2. The cleaning sheet 102 is normally held away from the circulation path 1 and in the cleaning sheet waiting zone 100. As shown in FIG. 3, a guide plate 103 is disposed at the junction between the circulation path 1 and the cleaning sheet waiting zone 100. When the cleaning sheet 102 is waiting in the cleaning sheet waiting zone 100, the guide plate 103 is in the position shown by the solid line in FIG. 3, and the image recording section 5, the image read-out section 6 and the erasing section 7 are kept operative. When the circulating and conveying means is to be cleaned, the guide plate 103 is moved to the position shown by the dotted line 103 and two nip rollers 104 are rotated in the directions shown by the solid arrows in FIG. 3 to introduce the cleaning sheet 102 into the circulation path 1. Then the cleaning sheet 102 is conveyed along the circulation path by the circulating and conveying means for conveying the stimulable phosphor sheet 2 with the image recording section 5, the image read-out section 6 and the erasing section 7 being made inoperative. The cleaning sheet 102 is circulated along the entire circulation path 1 at least once for each cleaning operation. Since both sides of the cleaning sheet 102 are adhesive, dust on the endless belts 3A, the guide rollers 3B, the guide plates 3C and the nip rollers 3D is removed therefrom as it adheres to the cleaning sheet 102 being conveyed along the circulation path 1. After the cleaning sheet 102 is circulated along the circulation path 1 a predetermined number of times, the guide plate 103 is moved again to the position shown by the dotted line 103' and the nip rollers 104 are rotated in the direction shown by the dotted arrows to return the cleaning sheet 102 to the cleaning sheet waiting zone 100. Then the guide plate 103 is returned to the position shown by the solid line, and the image recording section 5, the image read-out section 6 and the erasing section 7 are made operative. Thus, the circulating and conveying means is cleaned to prevent dust on the components of the circulating and conveying means from adhering to the stimulable phosphor sheets 2. Preferably the surface of the stimulable phosphor sheet 2 is sometimes cleaned.

Figure 4:
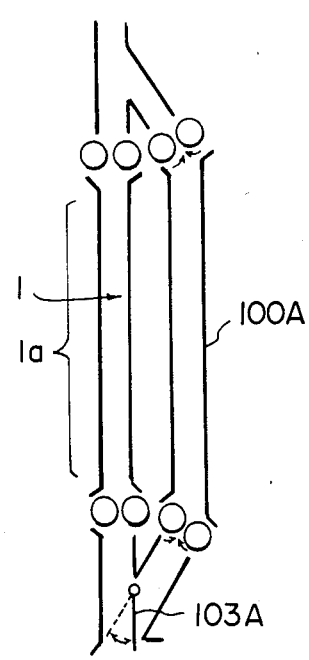
FIG. 4 is a fragmentary side view of a modification of the part shown in FIG. 3.

The cleaning sheet waiting zone may be in the form of a bypass passage as shown in FIG. 4. In FIG. 4, the cleaning sheet waiting zone 100A is a bypass passage having an inlet and outlet connected to the circulation path 1. The inlet and outlet are each provided with a pair of nip rollers. A guide plate 103A similar to the guide plate 103 in the above embodiment also is disposed at the inlet. In this case, the cleaning sheet 102 is introduced into the circulation path 1 from the outlet of the waiting zone 100A and returns to the waiting zone 100A through the inlet thereof. Accordingly, when the cleaning sheet 102 is conveyed along the circulation path 1 only once for each cleaning operation, the cleaning sheet 102 does not pass the part of the circulation path 1 which is parallel to the waiting zone 100A indicated at 1a, or the part downstream of the inlet of the waiting zone 100A and downstream of the outlet of the same. Therefore, in this case, the cleaning sheet 102 should be circulated at least twice for each cleaning operation.

Though the cleaning sheet 102 may have the adhesive material layer on only one side thereof, it is preferred that the adhesive material layer be on both sides of the cleaning sheet 102, since otherwise the cleaning sheet 102 must be carefully inserted into the circulation path 1 so that the side bearing thereon the adhesive material layer faces in the same direction as the side of the stimulable phosphor sheet 2 bearing the stimulable phosphor layer. Further, in the case of nip rollers, dust on one nip roller which does not come into contact with the side of the stimulable phosphor sheet 2 bearing the stimulable phosphor layer can be conveyed to the other roller which does come into contact with the side of the stimulable phosphor sheet 2 after the said other roller has been cleaned by the cleaning sheet. Therefore it is preferred that the cleaning sheet be provided with the adhesive material layer on both sides so that both nip rollers can be cleaned by the cleaning sheet.

The cleaning sheet may comprise an adhesive material formed into a sheet. For example, soft urethane can be formed into a sheet and can be used as a cleaning sheet. A cleaning sheet of soft urethane can be reused by washing off the dust with water.

Another embodiment of the present invention will be described with reference to FIG. 5.

In FIG. 5, a radiation image recording and read-out apparatus in accordance with this embodiment includes a circulating and conveying means comprising endless belts 201 to 213, guide rollers 214 to 220 driven by the endless belts 203, 204, 207, 210, 211, 212 and 213, guide plates 221 to 226 and nip rollers 227 and 228. Stimulable phosphor sheets 230 which are six in number in this particular embodiment are conveyed by the circulating and conveying means along the circulation path defined by the circulating and conveying means in the direction of the arrows in FIG. 5.

The uppermost two endless belts 201 and 202 are aligned with each other in a horizontal plane and a recording table 241 is disposed above the endless belts 201 and 202. A radiation source 242 for emitting radiation such as X-rays is disposed above the recording table 241. An image recording section 240 is thus formed. The stimulable phosphor sheet 230 positioned on the endless belt 201 is exposed to radiation from the radiation source 242 through an object lying on the recording table 241, whereby radiation image of the object 243 is stored in the stimulable phosphor sheet 230.

After exposure to radiation, the stimulable phosphor sheet 230 is conveyed to an image read-out section 250. In the image read-out section 250, a laser source 251 is provided above the endless belt 208. The image read-out section 250 further comprises a mirror 253, a galvanometer mirror 254 and mirrors 255 and 256 which are disposed to cause a laser beam 252 emitted from the laser source to scan the stimulable phosphor sheet 230 on the endless belt 208 in the direction of the width of the stimulable phosphor sheet 230 (the main scanning). Along the main scanning line of the laser beam 252, a reflecting mirror 257 is disposed and light emitted from the stimulable phosphor sheet 230 upon exposure to the laser beam 252 enters a light collecting optical element 258 from an incident end face 258A thereof directly or after being reflected by the reflecting mirror 257. In the light collecting optical element 258, the light is guided by total internal reflection to a photomultiplier 259 connected to an exit end face 258B of the light collecting optical element 258. While the main scanning is effected, the stimulable phosphor sheet 230 is conveyed (sub-scanning) by the endless belt 208 in a direction substantially perpendicular to the main scanning direction. That is, the stimulable phosphor sheet 230 is scanned two-dimensionally. The image signal obtained by the photomultiplier 259 is fed to an image processing circuit (not shown) and then fed to an image reproducing system such as a CRT or a recording device for reproducing a radiation image on a photosensitive film by scanning the photosensitive film with a light spot, or a memory for storing the image signal such as a magnetic recording tape.

Thereafter, the stimulable phosphor sheet 230 is fed to an erasing section 270 by the endless belt 209. The erasing section 270 includes a housing 271 and a plurality of erasing light sources 272 arranged in the housing 271. After a shutter 273 is opened, the stimulable phosphor sheet 230 is fed by the endless belt 209 until the stimulable phosphor sheet 230 is brought into contact with the nip rollers 227. Then the stimulable phosphor sheet 230 is introduced into the housing 271 by the nip rolless 227 and the shutter 273 is closed. The erasing light sources 272 emit light in the stimulating wavelength range of the stimulable phosphor on the stimulable phosphor sheet 230, and residual radiation energy in the stimulable phosphor sheet 230 is released therefrom by exposing the stimulable phosphor sheet 230 to the light emitted from the erasing light sources 272. The shutter 273 prevents the erasing light emitted from the erasing light sources 272 from reaching the image read-out section 250 and producing noise in the image signal.

The erased stimulable phosphor sheet 230 is discharged from the erasing section 270 by the nip rollers 278 and then returned to the image recording section 240 by the endless belts 210 to 213 to be delivered to the endless belt 201 in the image recording section 240. When the endless belts 210 to 213 and the image recording section 240 are still occupied by the preceding stimulable phosphor sheet or stimulable phosphor sheets 230, the stimulable phosphor sheet 230 is caused to wait on one of the endless belts 210 to 213 depending on the number of the preceding stimulable phosphor sheets occupying the endless belts 210 to 213 and the image recording section 240. If the endless belts 210 to 213 and the image recording section 240 are all occupied, the stimulable phosphor sheet 230, i.e., the sixth stimulable phosphor sheet 230, is returned to the endless belt 209 by rotating the nip rollers 227 in the reverse direction after erasure and is caused to wait on the endless belt 209.

When the circulating and conveying means is to be cleaned, one of the six stimulable phosphor sheets 230 is replaced by a cleaning sheet which may be the same as one shown in FIG. 2 and the circulating and conveying means is operated to convey the cleaning sheet at least once with the image recording section 240, the image read-out section 250 and the erasing section 270 being made inoperative. Alternatively, the cleaning sheet may be constantly circulated in place of one of the stimulable phosphor sheets 230 with the image recording section 240, the image read-out section 250 and the erasing section 270 being made inoperative in response to introduction of the cleaning sheet into the sections.

Figure 6:
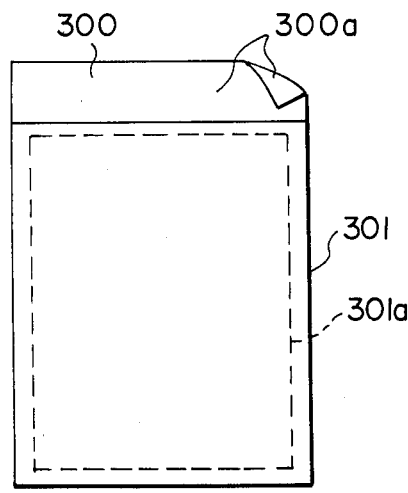
FIG. 6 is a plan view showing a modification of the cleaning sheet which can be employed in the present invention.
Figure 7:
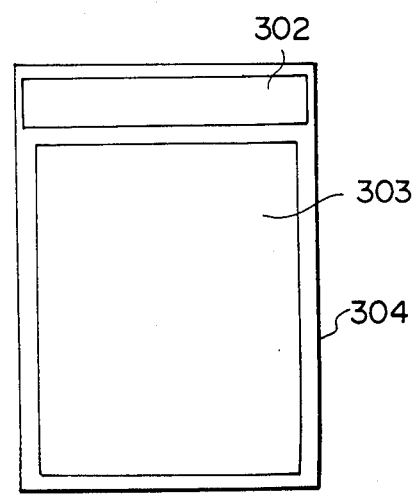
FIG. 7 is a plan view showing another modification of the cleaning sheet which can be employed in the present invention.

Though in the above embodiments the cleaning sheet is separate from the stimulable phosphor sheet, the cleaning sheet may be integral with the stimulable phosphor sheet as shown in FIGS. 6 and 7. In the example shown in FIG. 6, a cleaning sheet 300 having an adhesive layer on each side thereof is connected to a stimulable phosphor sheet 301. The cleaning sheet 300 is larger in width than the effective photographing area 301b of the stimulable phosphor sheet 301. In the example shown in FIG. 7, an adhesive layer 302 and a stimulable phosphor layer 303 are formed on a common base sheet 304, the adhesive layer 302 being larger than the stimulable phosphor layer 303 in width. In other words, stimulable phosphor sheets with a cleaning sheet portion are shown in FIGS. 6 and 7. Cleaning sheet portions may be provided on both sides of the stimulable phosphor sheets. The stimulable phosphor sheet with a cleaning sheet portion may be conveyed along the circulation path in a usual manner. The cleaning sheet portion removes dust from the circulating and conveying means similarly to the embodiments described above. The stimulable phosphor sheet with a cleaning sheet portion may be conveyed either from the end adjacent to the cleaning sheet portion or from the other end. Preferably the cleaning sheet portion is detachably connected to the stimulable phosphor sheet so that the cleaning sheet portion can be changed.

We claim:

1. A radiation image recording and read-out apparatus comprising:
   (i) a circulating and conveying means for conveying a plurality of stimulable phosphor sheets for recording radiation images thereon along a predetermined circulation path,
   (ii) an image recording secton positioned on said circulation path for recording the radiation image of an object on each of said stimulable phosphor sheets by exposing said stimulable phosphor sheet to a radiation passing through said object,
   (iii) an image read-out section positioned on said circulation path and provided with a stimulating ray source for emitting stimulating rays for scanning said stimulable phosphor sheet carrying said radiation image stored therein at said image recording section, and a photoelectric read-out means for detecting light emitted by said stimulable phosphor sheet scanned by said stimulating rays to obtain an electric image signal,
   (iv) an erasing section positioned on said circulation path for, prior to the next image recording on said stimulable phosphor sheet for which the image read-out has been conducted at said image read-out secton, having said stimulable phosphor sheet release the radiation energy remaining in said stimulable phosphor sheet, and
   (v) a cleaning sheet which is provided with an adhesive material layer on at least one side thereof, and means for conveying said cleaning sheet along the circulation path, said cleaning sheet comprising means for cleaning said circulating and conveying means.

2. A radiation image recording and read-out apparatus as defined in claim 1 wherein said means for conveying said cleaning sheet constantly circulates said cleaning sheet along the circulation path.

3. A radiation image recording and read-out apparatus as defined in claim 1 wherein said means for conveying said cleaning sheet circulates said cleaning sheet along the circulation path when said circulating and conveying means is to be cleaned.

4. A radiation image recording and read-out apparatus as defined in claim 3 in which a waiting zone is provided in a branch path which is branched off from said circulation path and means are provided for normally holding said cleaning sheet in the waiting zone and for introducing said cleaning sheet into the circulation path from the waiting zone when cleaning is required.

5. A radiation image recording and read-out apparatus as defined in claim 1 in which said cleaning sheet is provided with an adhesive material layer on both sides thereof.

6. A radiation image recording read-out apparatus as defined in claim 1 in which said cleaning sheet is formed integrally with respective ones of said stimulable phosphor sheets.

7. A stimulable phosphor sheet for use in a radiation image recording read-out apparatus, said apparatus including: a circulation and conveying means for conveying a plurality of stimulable phosphor sheets for recording radiation images thereon along a predetermined circulation path, an image recording section positioned on said circulation path for recording a radiation image of an object on each of said stimulable phosphor sheets by exposing each of stimulable phosphor sheets to a radiation passing through said object, an image read-out section positioned on said circulation path and provided with a stimulating ray source for emitting stimulating rays for scanning said stimulable phosphor sheet carrying said radiation image stored therein at said image recording section, and a photoelectric read-out means for detecting light emitted by said stimulable phosphor sheet scanned by said stimulating rays to obtain an electric image signal, an erasing section positioned on said circulation path for, prior to the next image recording on said stimulable phosphor sheet for which the image read-out has been conducted at said image read-out section, having said stimulable phosphor sheet release the radiation energy remaining in said stimuable phosphor sheet, a cleaning sheet which is provided with an adhesive material layer on at least one side thereof, and means for conveying said cleaning sheet along the circulation path, comprising:

a cleaning portion provided integrally with the stimulable phosphor sheet, said cleaning portion having an adhesive material layer comprising means for cleaning the circulating and conveying means.

8. A stimulable phosphor sheet as defined in claim 7 wherein said cleaning portion has a width not smaller than that of the image recording area of the stimulable phosphor sheet.

9. A stimulable phosphor sheet as defined in claim 7 wherein said cleaning portion is provided at a leading end thereof with respect to the conveying direction of the stimulable phosphor sheet.

10. A stimulable phosphor sheet as defined in claim 7 wherein said cleaning portion is provided at a trailing end thereof with respect to the conveying direction of the stimulable phosphor sheet.

11. A stimulable phosphor sheet as defined in claim 7 wherein said cleaning portion has the adhesive material layer on both sides thereof.

* * * * *